Jan. 3, 1939.　　A. E. SIDWELL　　2,142,338
RATE OF CLIMB INDICATOR
Filed March 6, 1937　　4 Sheets-Sheet 1
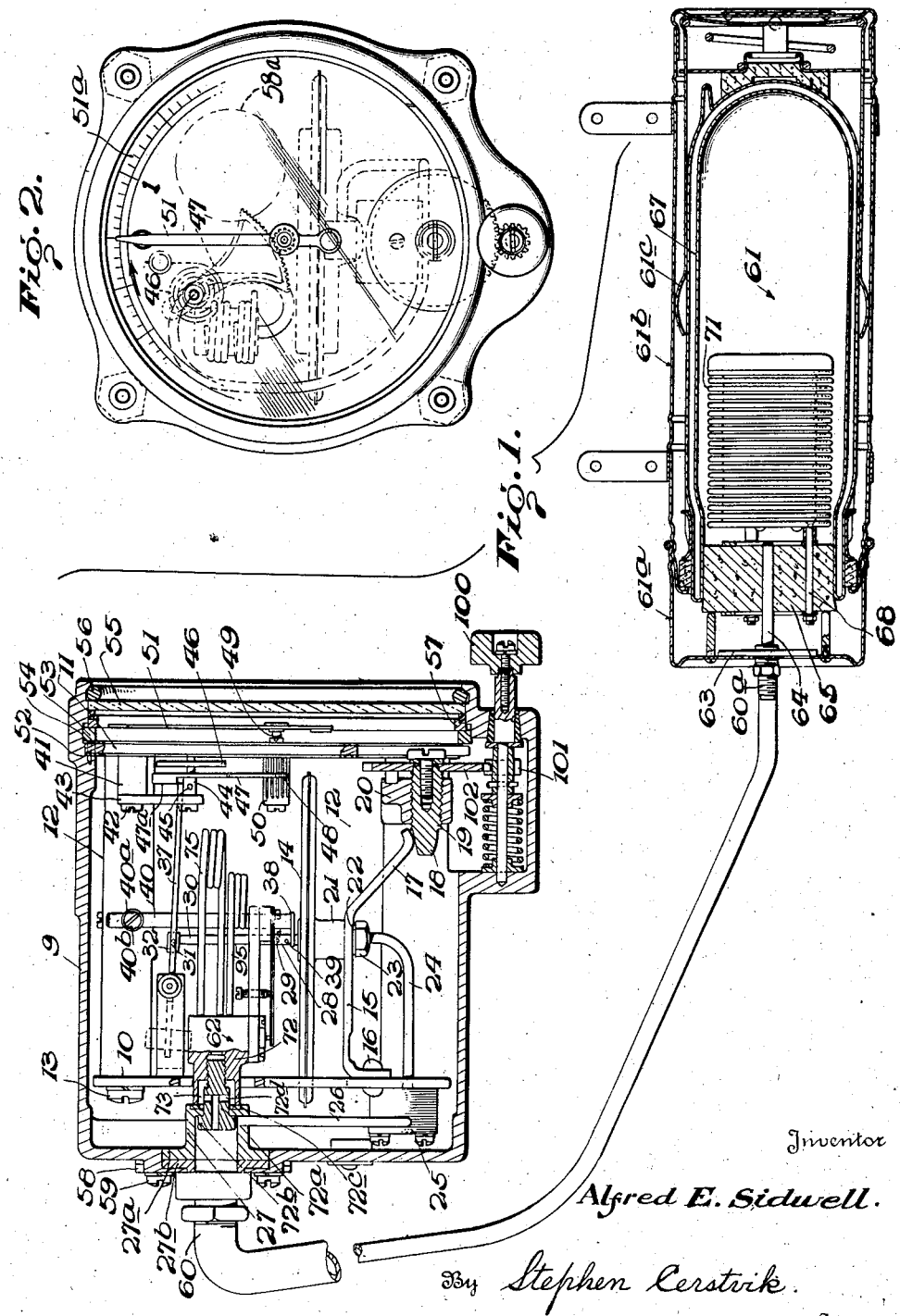
Inventor
Alfred E. Sidwell.
By Stephen Cerstvik.
Attorney Jan. 3, 1939.  A. E. SIDWELL  2,142,338
RATE OF CLIMB INDICATOR
Filed March 6, 1937   4 Sheets-Sheet 2

Inventor
Alfred E. Sidwell.
By Stephen Cerstvik.
Attorney

Jan. 3, 1939.  A. E. SIDWELL  2,142,338
RATE OF CLIMB INDICATOR
Filed March 6, 1937   4 Sheets-Sheet 3
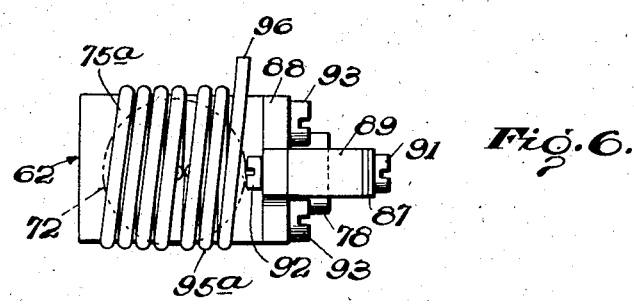
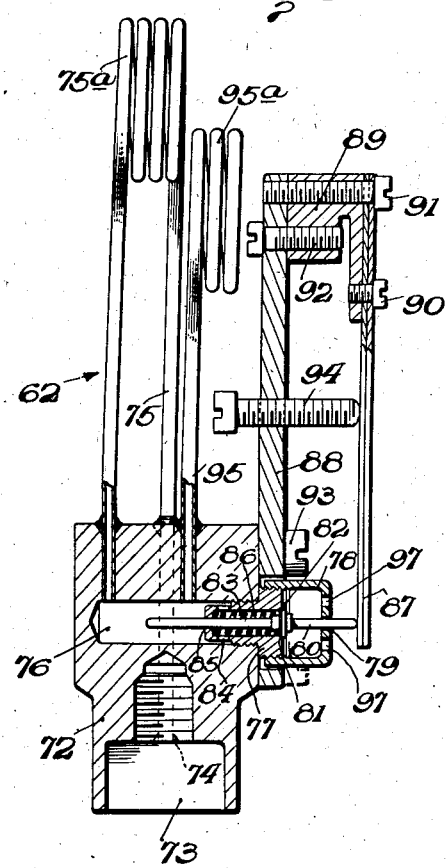
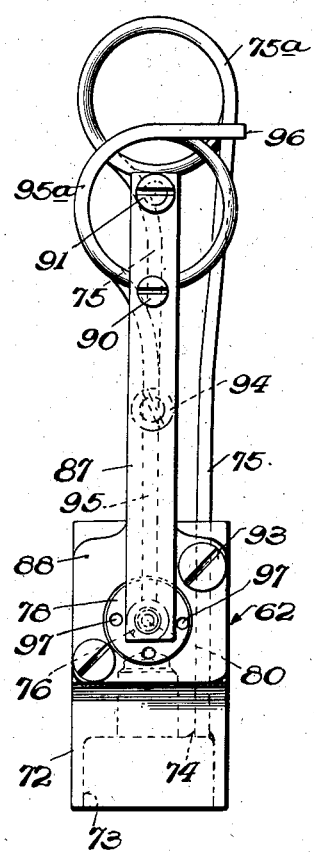
Inventor
Alfred E. Sidwell.
By Stephen Cerstvik.
Attorney Jan. 3, 1939.   A. E. SIDWELL   2,142,338
RATE OF CLIMB INDICATOR
Filed March 6, 1937    4 Sheets-Sheet 4

INVENTOR.
Alfred E. Sidwell
BY Stephen Gerstvik
ATTORNEY.

Patented Jan. 3, 1939

2,142,338

UNITED STATES PATENT OFFICE 2,142,338

RATE OF CLIMB INDICATOR

Alfred E. Sidwell, Kew Gardens, N. Y., assignor to Bendix Aviation Corporation, South Bend, Ind., a corporation of Delaware Application March 6, 1937, Serial No. 129,504

21 Claims. (Cl. 264—1)

The present invention relates to pressure responsive indicating instruments and more particularly to pressure responsive instruments such as aircraft rate of climb indicators, for example, wherein a differential pressure is utilized to actuate an indicating element to indicate the rate of change of altitude.

The invention is embodied in an aircraft rate of climb indicator wherein a differential pressure is established due to change in altitude and wherein means are provided to equalize said pressure when the altitude ceases to change.

More specifically, the rate of climb indicator embodying the invention is provided with novel means for regulating the equalization in order to provide compensation for certain conditions.

Rate of climb indicators of the prior art have been provided with means for equalization of the differential pressure such, for example, as a capillary tube or restricted passage but no means were provided whereby inaccuracies due to changes in certain conditions of the atmosphere could be compensated, as for example, due to changes in temperature or barometric pressure or both.

Upon an increase in temperature above the normal temperature at which the rate of climb indicator is calibrated the air from the inside of the pressure responsive device encounters greater difficulty in flowing through the capillary or restricted passage thereby maintaining the differential pressure for a greater period of time than at the normal temperature thus giving an indication of too high a rate of climb.

Conversely, upon a decrease in temperature below the normal temperature, the air flows more freely through the capillary passage, thereby maintaining the differential pressure for a shorter period of time than at the normal temperature, thus giving an indication of too low a rate of climb.

Upon an increase in altitude above sea level the barometric pressure decreases and the air becomes rarified. This rarified air has greater viscosity and hence encounters greater difficulty in flowing through the capillary or restricted passage and, therefore, the device gives an indication of too high a rate of climb.

Accordingly, one of the objects of the present invention is to provide, in an instrument of the class described, novel means whereby the foregoing undesirable characteristics are eliminated.

Another object is to provide a novel rate of climb indicator in which the errors due to changes in certain conditions in the atmosphere, such as temperature and pressure changes due to changes in altitude are compensated.

A further object is to provide a novel rate of climb indicator comprising means establishing a pressure differential proportional to the rate of climb, and temperature controlled means governing the equalization of said differential whereby errors due to temperature changes are eliminated.

A still further object is to provide in a novel rate of climb indicator including a pressure responsive element, a plurality of capillary means regulating the flow of air from said element and means responsive to a change in condition of the atmosphere for regulating the arrangement of said capillaries.

Other and further objects and advantages of the invention will appear more fully hereinafter from a consideration of the detailed description which follows, taken together with the accompanying drawings wherein is illustrated one embodiment of the invention. It is to be expressly understood, however, that the drawings are for the purposes of illustration only and are not designed as a definition of the limits of the invention, reference being had for this purpose to the appended claims.

In the drawings wherein like reference characters refer to like parts throughout the several views:

Fig. 1 is a side elevation, partly in section, of the device embodying the present invention including a reservoir and bellows therein;

Fig. 2 is a front elevation of the instrument proper as shown in Fig. 1;

Fig. 5 is a section illustrating the structure of the capillary tubing and temperature compensation device;

Fig. 6 is an end view of the device shown in Fig. 5;

Fig. 7 is a plan view of the device shown in Fig. 5, and

Figure 3:
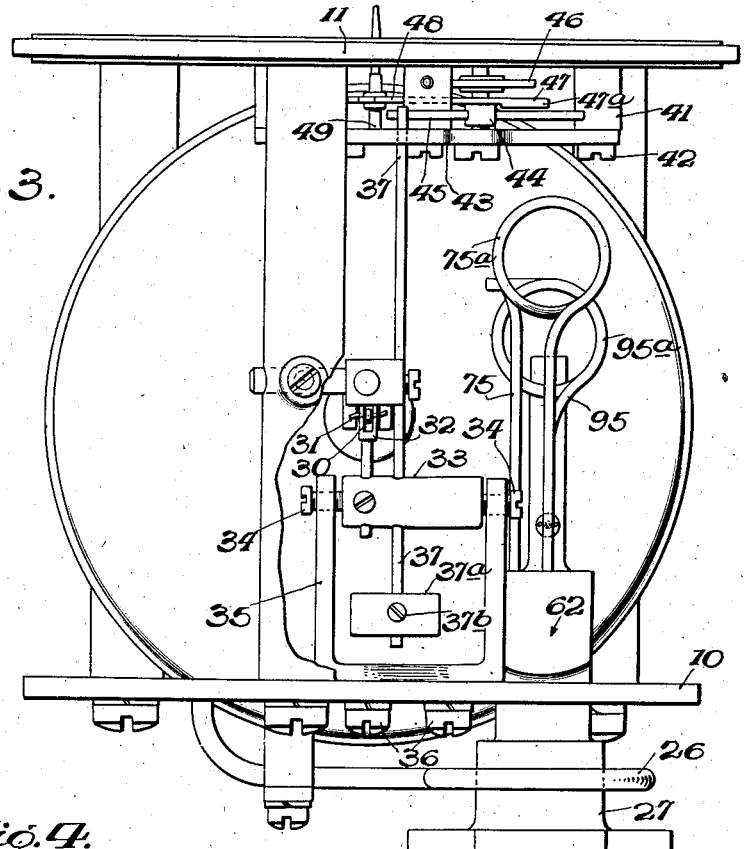
Fig. 3 is a plan view of the instrument proper of Fig. 1 with the casing removed.

Referring to the drawings and more particularly to Fig. 1, the instrument embodying the present invention, as shown, comprises a casing 9 in which is mounted the operating mechanism. Said mechanism is mounted on a frame of any suitable type which, in the present embodiment, comprises a rear frame member or plate 10 and a face plate 11, said plates being held in spaced relation by spacers 12 and screws 13.

Mounted in the frame thus constituted, is a pressure responsive expansible element or chamber 14 adapted to operate an indicating element when a pressure differential is established between the pressures, inside and outside of said chamber 14. This may be accomplished, for example, by providing communication between the atmosphere and the inside of the casing 9. The pressure of the atmosphere is, therefore, exerted on the outside of the pressure chamber 14 while the inside of said chamber is connected to the inside of the casing and, therefore, to said atmosphere by a plurality of capillary elements.

As shown in the drawings by way of example, pressure responsive chamber 14 comprises a diaphragm capsule mounted on a flexible arm 15 carried by plate 10 and fastened thereto by rivets 16. To provide for adjusting the instrument, the end 17 of the flexible arm 15 is bent at an angle to said arm and engages the cone-shaped end 18 of a set screw 19 that is threaded in a bracket 20 mounted on or formed integral with face plate 11. Element 14 may be supported by means of a central boss 21 that extends through the flexible arm 15 and is secured thereto by means of lock washer 22 and a nut 23, said boss being hollow and connected to a tube 24 held in position by tube clamp 25 and in communication with the interior of the casing by means of 26, a continuation of tube 24, and the interior of coupling 27 which is connected to the inside of the casing through a capillary assembly and to the reservoir as will be set out more in detail later.

In order to actuate the indicating element or pointer of the instrument, suitable connections are provided between the pressure responsive element and the pointer. These connections comprise a short post 28 connected to the center of the pressure element 14 on the side thereof opposite to boss 21 and pivotally connected at 29 to one end of link 30. The other end of link 30 (see Fig. 3) is pivotally connected at 31 to slotted rocker arm 32 on rockshaft 33. Rockshaft 33 is rotatably mounted in adjustable bearings 34 carried by a U-bracket 35 secured to plate 10 by screws 36. Mounted on or formed integral with said rockshaft 33 is an arm 37 carrying counterweight 37a adjustably mounted thereon by screw 37b. Movements of element 14 are transferred to said arm 37 by means of the linkages set out above.

In order to limit the movement of element 14, post 28 mounted thereon is arranged to be engaged by the fingers of fork 38 (see Fig. 1) whereby the element 14 will abut fork 38 after limited movement in one direction while pin 39 secured to the post 28 abuts fork 38 upon limited movement of element 14 in the opposite direction. Said fork may be so assembled as to be adjustable longitudinally of post 28 as by mounting it on a rod 40 adjustably connected to one of the spacers 12 by hollow post 40a and screw 40b.

In order to further transmit the motion of the element 14 by means of its movement of arm 37 there is mounted on face plate 11 by means of spacers 41 and screws 42 a V-shaped plate 43. Rotatably mounted in plate 43 is spindle 44. A rod 45 passes through spindle 44 and extends beneath the arm 37 (see Fig. 3) whereby it can be rotated in one direction by said arm 37. Connected to said spindle 44 is a hair spring 46 which rotates the spindle 44 to always move rod 45 against arm 37. In this manner the expansion and contraction of pressure element 14 is converted into rotation of spindle 44 in one direction or the other. Gear sector 47, counterweighted at 47a carried on said spindle 44 meshes with a pinion 48 carried on a second spindle 49 rotatably mounted in plate 50 (directly below 43 in Fig. 1). Said spindle 49 extends through plate 11 and carries at its outer end a pointer 51 moving over scale 51a.

The mechanism above described is mounted in the casing 9 which may be of any suitable material such as "Bakelite", the face plate 11 being seated against shoulder 52 and held thereagainst by split ring 53 which engages the underside of a shoulder 54 formed in the casing. The front end of the casing is closed by means of cover glass 55 held in place by split ring 56 on one side and split facing ring 57 on the other.

The coupling member 27 is provided with a flange 27a fastened to an insert 27b moulded in casing 9. Connected to said insert is a conduit 60 leading to the thermally insulated expansion chamber 61. Flange 58 encircling opening 58a in casing 9 is fastened to said casing by screws 59 and forms the connection means for a dehumidifier case (not shown), whereby air at static atmospheric pressure enters casing 9.

Also connected to said coupling member 27 is a combined capillary structure and valve generically designated as 62 whereby the air from within pressure element 14 is allowed to escape in a regulated manner.

With capillary means, as referred to above, the rate at which the air escapes depends upon the temperature and the pressure due to altitude. At low temperatures, the air escapes more readily from the capillary and thereby reduces the pressure in element 14 too quickly thereby producing an under-reading or indication by pointer 51.

Upon an increase in altitude, the air escapes less readily from the capillary and, therefore, the pressure inside of 14 reduces too slowly thereby giving an over-reading or indication by pointer 51.

Figure 4:
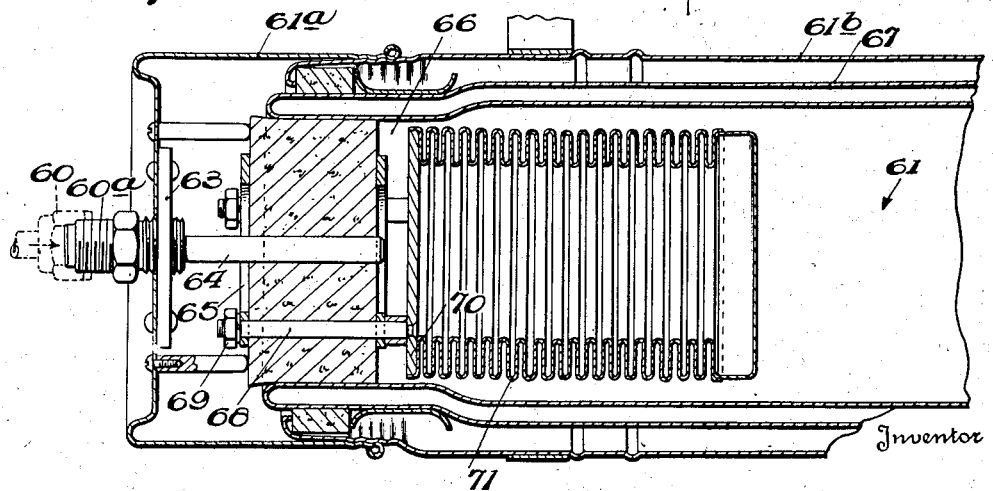
Fig. 4 is a cross-section showing in detail the construction of the reservoir and bellows.

Fig. 4 illustrates in detail the device used for altitude compensation which may be of the type disclosed and claimed in co-pending application of Paul W. Koch, Serial No. 119,045, filed January 4, 1937, wherein bellows are inserted within the reservoir so that the errors due to changes in altitude are eliminated.

Referring to Fig. 4, there is provided a conduit 60 leading from coupling member 27 and connected to bushing 60a passing through plate 63 riveted to the cap 61a of a thermally insulated reservoir 61. Bushing 60a is connected to a conduit 64 which passes through the base 65 and into the reservoir 61 which, in the present instance, comprises the vacuum bottle or heat insulated device 67 centered in a shell 61b by spring 61c (see Fig. 1). Fastened to said base 65 by the rivet bolt connections 68 and nuts 69 is a base 70 on which is mounted bellows 71, said bellows being evacuated whereby it is held in a compressed state at standard (sea level) atmospheric pressure within the chamber 61. Upon a lowering of the atmospheric pressure, the bellows expands to thereby cut down the effective volume of air in the reservoir.

Means are now provided whereby the errors due to temperature changes and pressure changes due to altitude changes may be compensated.

Generically, such means comprise two capillaries connected in series, but under certain conditions one of them may be by-passed, whereby the movement of air from element 14 is regulated, and the errors due to temperature changes or altitude changes are thereby eliminated.

In Figs. 5 through 7 are shown the details of the combined capillary structure and valve assembly 62 embodying the present invention. The valve assembly comprises a base 72 which is fastened in position by means of threaded sleeve 72a (see Fig. 1) which cooperates with threads on base 72. Head 72b on the threaded sleeve abuts the inside of the coupling 27 to pull base 72 tightly against sealing material 72c. Sleeve 72a has openings 72d therein leading from coupling 27 to chamber 73 in base 72 (see Fig. 1).

Leading from chamber 73 by brazed connection 74 (see Fig. 7) is capillary tube 75 (see Fig. 5) coiled into form 75a and leading to chamber 76 of the valve structure. Screwed into said chamber 76 is fitting 77 capped by a screw fitting 78 which provides one guide 79 for the rod 80 of a valve 82 cooperating with a valve seat 81 either of which may be tapered, leading to opening 83 and valve ports 84. Fitting 77 is provided with guide 85 for the other end of rod 80. Spring 86 normally urges the valve 81 away from the valve seat 82 while a temperature-actuated bi-metallic strip 87 tends to close the valve against the force of spring 86 by pressing against rod 80. The valve may be designed either to be completely opened or completely closed or else partially closed to different degrees or completely closed with varying degrees of opening depending upon the amount of flexure of the bi-metallic strip 87 according to the temperature.

The thermo-responsive element 87 is mounted on a base 88 by means of sub-base 89 and held thereon by screws 90, 91, the latter co-acting with screw 92 to hold the sub-base on base 88. Base 88 is held on base 72 by suitable means such as a screw 93. Mounted on base 88 is set screw 94 whereby the setting of temperature actuated element 87 may be adjusted.

Leading from chamber 76 is a second capillary tube 95 formed into coil 95a and exhausting at 96 into the interior of casing 9.

Valve 82 serves to control the flow of air from the diaphragm 14 and reservoir 61 through capillary tube 75 and valve chamber 76 or capillary tubes 75 and 95 into casing 9. When valve 82 is completely open, the capillary tube 95 is completely by-passed and air is thus allowed to pass through capillary tube 75 only and escapes to the interior of casing 9 by means of chamber 76, ports 84, uncovered valve seat 82 and openings 97. On the other hand, if the valve 82 is closed completely, then the air from the diaphragm 14 and reservoir 61 must pass through both capillary tubes 75 and 95 before it can escape into the casing 9 to equalize the pressures inside and outside of the diaphragm 14. The strip 87 is so arranged that for the lowest temperature below normal it is caused to flex to its limit to the left (as viewed in Fig. 5) to completely or partly close the valve 82 as desired whereby all the air or part thereof respectively is forced to flow through both capillaries 75 and 95 and is, therefore, retarded to a greater extent than when the valve is completely open and the air flows through capillary 75 only. Thus, the indication of pointer 51, which would otherwise be low at low temperatures, is increased to the correct reading. On the other hand, at the extreme high temperature above normal, the strip is flexed to its limit to the right (as viewed in Fig. 5) so that the valve 82 is completely open and the air flows through capillary 75 only. For the normal temperature at which the instrument is calibrated, and for temperatures between normal and the extreme high and low temperatures, the valve 82 is partially open, and more or less according to the prevailing temperature, so that after flowing through capillary 75, part of the air may flow through capillary tube 95 and part through the valve 82. Thus, the amount of retardation offered by the capillaries depends upon the temperature and in this manner the instrument is made to read correctly for all temperatures from the highest to the lowest.

The operation of the device is as follows: At ground level air at normal (sea level) atmospheric pressure enters the interior of casing 9 and flows either through openings 97, uncovered valve seat 82, ports 84 to chamber 76 and then by capillary 75 to chamber 73, or else it enters capillary 95 at point 96 and thereby flows to chamber 76 and then by capillary 75 to chamber 73. The path taken by the air depends upon the temperature and the setting of element 87. The air then proceeds from chamber 73 to the interior of 27 and thence by tubing extension 26, past clamp 25, to tube 24 leading to the inside of pressure chamber 14. When the device remains at the same altitude for an appreciable length of time the pressure inside pressure element 14 and on the outside thereof become equal. The pointer is then adjusted to zero by means of knob 100 (see Fig. 1) which turns pinion 101 to revolve gear 102 to rotate set screw 19 to adjust cone 18 and arm 17 so that pointer 51 indicates zero.

Upon an increase in altitude the pressure within casing 9 assumes the pressure at the new altitude. This pressure is not immediately transferred to the inside of element 14, consequently said element 14 expands and moves pointer 51. As air is always escaping from 14 during the rise, the expansion of element 14 and, hence, the indication of pointer 51 is proportional to the rate of rise. The pressure inside of element 14 escapes by means of tubing 24, 26, element 27 and capillary 75 to the chamber 76. If the temperature of the air is at the extreme limit below that at which element 87 is adjusted for normal temperature, this element presses against rod 80 to hold valve 81 either to close off or completely seal 82 and the air from chamber 76 is forced to pass through capillary 95 as well as capillary 75 and escapes at 96. This additional passage through capillary 95, as explained hereinbefore, compensates for the tendency of the cooler air to flow more freely at the lower temperatures. Hence, the air escapes from the inside of pressure element 14 and reservoir 61 at the desired rate and the under indication of pointer 51 is avoided. If the temperature is at the extreme limit above the normal setting for element 87 the pressure on rod 80 is decreased or removed and air is allowed to escape from chamber 76 by ports 84, chamber 83, uncovered valve seat 82 and openings 97, thereby by-passing capillary 95. As air flows less freely through the capillaries at higher temperatures this flow is increased by by-passing capillary 95 to thereby compensate for the over-reading of pointer 51 at an increase in temperature. For temperatures between the highest and lowest, the valve 82 is partially open to different degrees so that the air flows partially through capillary 95 and partially through the valve.

Figure 8:
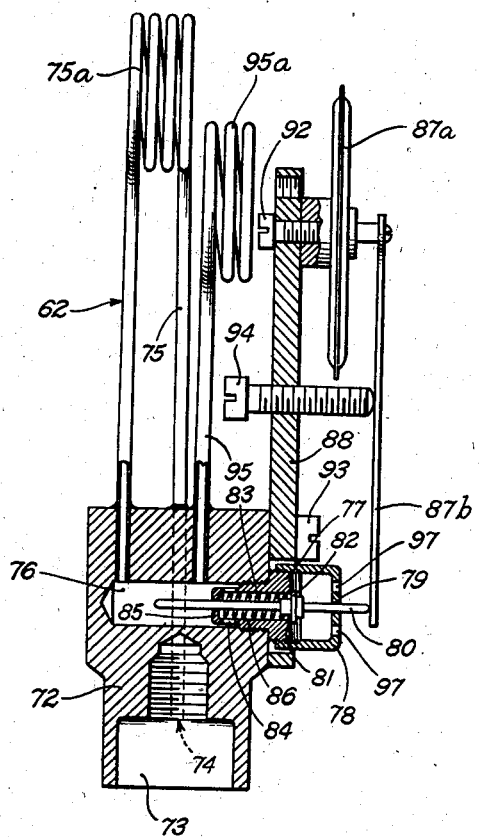
Fig. 8 is a section as in Fig. 5 wherein the temperature responsive device is replaced by a pressure responsive device.

Means operated by other conditions of the atmosphere as, for instance, by changes in pressure due to changes in altitude may be used to operate the valve 81, 82. In such a case a decrease in pressure will open the valve to partially or completely by-pass the second capillary. Such a construction is shown in Fig. 8 which illustrates a device as in Fig. 5 with the exception that the bi-metal element 87 of Fig. 5 is replaced by aneroid element 87a and arm 87b which open the valve 81, 82 upon a decrease in pressure. The operation is otherwise as described in connection with the device of Fig. 5.

There is thus provided a rate of climb indicator wherein the rate of rise or descent, i. e., the rate of change in altitude, can be indicated and errors due to changes in temperature and other changes in atmospheric conditions may be compensated.

Although only one embodiment of the invention has been illustrated and described other changes and modifications in form, materials and relative arrangement of parts, which will now appear to those skilled in the art, may be made without departing from the scope of the invention. Reference, therefore, is to be had to the appended claims for a definition of the limits of the invention.

What is claimed is:

1. In an instrument of the class described having a pressure responsive element, means whereby the atmosphere inside and outside said element is in communication comprising a chamber, capillary means leading from said chamber to the atmosphere outside said element, capillary means leading from said chamber to the atmosphere inside said element, said chamber having an opening also communicating with one of said atmospheres, a valve for controlling said opening, and atmospheric temperature responsive means controlling the opening of said valve.

2. In combination, an expansible diaphragm having a yielding wall subject to atmospheric pressure on one side thereof, a plurality of elements for retarding the rate at which pressure on the other side of said yielding wall tends to become equal to a changing atmospheric pressure, indicating means actuated by said yielding wall in accordance with the rate of change of altitude, valve means for by-passing one of said retarding elements, and temperature responsive means for operating said valve means.

3. In combination, an expansible diaphragm having a yielding wall subject to a changing atmospheric pressure on one side thereof, a plurality of capillary elements for separately retarding the rate at which pressure on the other side of said yielding wall tends to become equal to said changing pressure, indicating means actuated by said yielding wall in accordance with the rate of change of atmospheric pressure, and means including means responsive to changes in a condition of the atmosphere for by-passing one of said capillary elements, said condition of the atmosphere being one of the group consisting of pressure of the atmosphere and temperature of the atmosphere.

4. In combination, a chamber, gas within and outside of said chamber, a plurality of flow restricting elements connected to said chamber, and means including means responsive to changes in the temperature of the gas for by-passing certain of said restricting elements.

5. In an instrument of the class described, a plurality of capillary means, and means including temperature responsive means for by-passing certain of said capillary means.

6. Equalizing means comprising an enclosure, capillary means leading from said enclosure to a source of atmospheric pressure, means leading from said enclosure to a different source of pressure, an opening in said enclosure, means controlling said opening, and means responsive to a change in condition of the atmosphere for actuating said last-named means to regulate said opening to control the by-passing of said capillary means, said condition of the atmosphere being one of the group consisting of pressure of the atmosphere and temperature of the atmosphere.

7. In an instrument of the class described, having a pressure chamber, means whereby the atmosphere inside and outside said chamber is in communication comprising a plurality of capillary elements serially arranged in the path of travel of said atmosphere, and means including means responsive to changes in the temperature of the atmosphere for by-passing one of said elements.

8. In an instrument having a pressure element, means whereby the atmosphere inside and outside said element is in communication comprising a chamber, a capillary means interposed between said chamber and said inside atmosphere, capillary means interposed between said chamber and said outside atmosphere, an opening in said chamber directly communicating with one of said atmospheres, valve means controlling said opening, and means responsive to changes in temperature of the atmosphere for actuating said valve means to control said opening.

9. Equalizing means comprising a hollow body, a capillary element leading from said body to a source of pressure, a second capillary leading from said body to a different pressure, an opening in said body, a valve controlling said opening, and temperature responsive means for actuating said valve whereby one of said elements is incrementally by-passed.

10. In an instrument of the class described, a casing, an opening in said casing leading to the atmosphere, a pressure responsive element in said casing, capillary means whereby the interior of said pressure responsive device is in communication with said atmosphere and comprising a plurality of capillaries, valve means, and means responsive to a change in atmospheric temperature for controlling said valve means to modify the action of certain of said capillary means.

11. In combination, an expansible diaphragm having a yielding wall subject to atmospheric pressure on one side thereof, a plurality of elements for separately retarding the rate at which pressure on the other side of said yielding wall tends to become equal to a changing atmospheric pressure, and means responsive to changes in a condition of the atmosphere for modifying the retarding action of one of said retarding elements, said condition of the atmosphere being one of the group consisting of pressure of the atmosphere and temperature of the atmosphere.

12. In combination, an expansible diaphragm having a yielding wall subject to atmospheric pressure on one side thereof, a plurality of elements for separately retarding the rate at which pressure on the other side of said yielding wall tends to become equal to a changing atmospheric pressure, means responsive to changes in a condition of the atmosphere for modifying the retarding action of one of said retarding elements, said condition of the atmosphere being one of the group consisting of pressure of the atmosphere and temperature of the atmosphere, and indicating means actuated by said yielding wall in accordance with the rate of change of altitude.

13. In a device of the character described, a flow controlling assembly comprising a plurality of capillary elements, and control means responsive to temperature changes for rendering certain of said elements ineffective.

14. In a device of the character described, a flow controlling assembly comprising a plurality of capillary elements, and means including means responsive to a change in a condition of the atmosphere for rendering certain of said elements ineffective, said condition of the atmosphere being one of the group consisting of pressure of the atmosphere and temperature of the atmosphere.

15. In an instrument of the class described, a plurality of capillary means, and means including means responsive to a change in a condition of the atmosphere for by-passing certain of said capillary means, said condition of the atmosphere being one of the group consisting of pressure of the atmosphere and temperature of the atmosphere.

16. In combination, an expansible diaphragm device having a yielding wall subject to atmospheric pressure on one side thereof, a plurality of elements for retarding the rate at which pressure on the other side of said yielding wall tends to become equal to a changing atmospheric pressure, and means responsive to changes in a condition of the atmosphere for modifying the retarding action of one of said retarding elements, said condition of the atmosphere being one of the group consisting of pressure of the atmosphere and temperature of the atmosphere.

17. In combination, an expansible diaphragm device having a yielding wall subject to atmospheric pressure on one side thereof, a plurality of elements for retarding the rate at which pressure on the other side of said wall tends to become equal to a changing atmospheric pressure, means responsive to changes in a condition of the atmosphere for modifying the retarding action of one of said retarding elements, said condition of the atmosphere being one of the group consisting of pressure of the atmosphere and temperature of the atmosphere, and indicating means actuated by said yielding wall.

18. In a rate of climb responsive device, the combination with a chamber enclosing a volume of air, and a differential pressure responsive member connected to respond to a difference in pressure between said chamber and the atmospheric air, of a plurality of air flow retarding elements connecting said chamber and the atmosphere, and means responsive to a condition of the atmosphere for controlling the retarding action of at least one of said retarding elements, said condition of the atmosphere being one of the group consisting of pressure of the atmosphere and temperature of the atmosphere.

19. In a rate of climb responsive device, the combination with a chamber enclosing a volume of air, and a differential pressure responsive member connected to respond to a difference in pressure between said chamber and the atmospheric air, of a plurality of air flow retarding elements connecting said chamber and the atmosphere, and temperature responsive means for controlling the retarding action of at least one of said retarding elements.

20. In a device of the class described, a plurality of flow retarding elements at least one of said elements comprising a capillary and control means responsive to changes in temperature for rendering certain of said elements ineffective.

21. In a device of the class described, a plurality of flow retarding elements at least one of said elements comprising a capillary and control means responsive to a change in a condition of the atmosphere for rendering certain of said elements ineffective, said condition of the atmosphere being one of the group consisting of pressure of the atmosphere and temperature of the atmosphere.

ALFRED E. SIDWELL.